United States Patent
Duda

(10) Patent No.: US 9,281,954 B2
(45) Date of Patent: Mar. 8, 2016

(54) METHOD AND SYSTEM FOR PROTOCOL INDEPENDENT MULTICASTING IN MULTICHASSIS LINK AGGREGATION DOMAINS

(71) Applicant: Kenneth James Duda, Santa Clara, CA (US)

(72) Inventor: Kenneth James Duda, Santa Clara, CA (US)

(73) Assignee: Arista Networks, Inc., Santa Clara, CA (US)

( * ) Notice: Subject to any disclaimer, the term of this patent is extended or adjusted under 35 U.S.C. 154(b) by 65 days.

(21) Appl. No.: 14/264,458

(22) Filed: Apr. 29, 2014

(65) Prior Publication Data

US 2015/0312049 A1 Oct. 29, 2015

(51) Int. Cl.
| | |
|---|---|
| *H04L 12/18* | (2006.01) |
| *H04L 12/721* | (2013.01) |
| *H04L 12/947* | (2013.01) |
| *H04L 12/46* | (2006.01) |
| *H04L 12/931* | (2013.01) |

(52) U.S. Cl.
CPC ......... *H04L 12/185* (2013.01); *H04L 12/4645* (2013.01); *H04L 45/66* (2013.01); *H04L 49/25* (2013.01); *H04L 49/354* (2013.01); *H04L 49/201* (2013.01); *H04L 49/70* (2013.01)

(58) Field of Classification Search
CPC .................................................. H04L 49/201
See application file for complete search history.

(56) References Cited

U.S. PATENT DOCUMENTS

| | | | |
|---|---|---|---|
| 7,839,843 B2 * | 11/2010 | Dontu | H04L 12/46 370/389 |
| 8,730,963 B1 | 5/2014 | Grosser, Jr. et al. | |
| 2007/0230366 A1 | 10/2007 | Takatori | |
| 2008/0137660 A1 * | 6/2008 | Olakangil | H04L 12/1836 370/392 |
| 2010/0211658 A1 | 8/2010 | Hoogerwerf et al. | |
| 2011/0228767 A1 * | 9/2011 | Singla | H04L 49/00 370/389 |
| 2011/0280572 A1 * | 11/2011 | Vobbilisetty | H04L 49/70 398/45 |
| 2011/0299528 A1 * | 12/2011 | Yu | H04L 12/1886 370/390 |
| 2012/0033668 A1 | 2/2012 | Humphries | |
| 2013/0003733 A1 * | 1/2013 | Venkatesan | H04L 12/4625 370/390 |
| 2013/0201986 A1 * | 8/2013 | Sajassi | H04L 45/48 370/390 |
| 2014/0036924 A1 * | 2/2014 | Christenson | H04L 12/4641 370/395.53 |
| 2014/0140220 A1 | 5/2014 | Janardhanan et al. | |
| 2014/0362854 A1 * | 12/2014 | Addanki | H04L 12/185 370/390 |
| 2015/0016462 A1 * | 1/2015 | Zhou | H04L 12/4633 370/392 |
| 2015/0085862 A1 * | 3/2015 | Song | H04L 12/1886 370/390 |
| 2015/0188753 A1 * | 7/2015 | Anumala | H04L 12/4641 370/225 |

OTHER PUBLICATIONS

International Search Report and Written Opinion issued in the International Application No. PCT/US2015/028242, mailed Jul. 20, 2015 (14 pages).

(Continued)

*Primary Examiner* — Benjamin Lamont
(74) *Attorney, Agent, or Firm* — Osha • Liang LLP

(57) ABSTRACT

A method for processing IP multicast packets in a Multichassis Link Aggregation (MLAG) domain. The method includes processing the IP multicast packet using the bridging functionality and the routing functionality implemented by each of the MLAG peers to process the IP multicast packets.

15 Claims, 11 Drawing Sheets

(56) References Cited

OTHER PUBLICATIONS

Carolyn J. Sher Decusatis Et Al, "Communications within clouds: open standards and proprietary protocols for data center networking", IEEE Communications Magazine, IEEE Service Center, Piscataway, US, vol. 50, No. 9, Sep. 1, 2012, pp. 26-33, XP011478276 (8 pages).

Mingui Zhang Huawei, Radia Perlman Intel, Hongjun Zhai, Muhammad Durrani, Mukhtiar Shaikh Brocade, Sujay Gupta: "TRILL Active-Active Edge Using Multiple MAC Attachments; draft-zhang-trill-aa-multi-attach-03.txt", Internet Engineering Task Force; Standardworkingdraft, Internet Society 4, Rue Des Falaises CH-1205; Geneva, Switzerland, Apr. 18, 2014; p. 1-16, XP015098752 (16 pages).

Office Action issued in the related U.S. Appl. No. 13/863,504, issued Jun. 11, 2015 (11 pages).

* cited by examiner

| VLAN | Associated External Devices |
|---|---|
| VLAN A | A1, A2, A3, A4 |
| VLAN B | B1, B2 |
| VLAN C | C1 |
| VLAN D | D1, D2 |

FIG. 4B

IP Multicast Rules for Router A

| VLAN | IP Multicast Rule |
|---|---|
| VLAN A | Route to VLAN B |
| VLAN A | Route to VLAN C |

FIG. 4C

IP Multicast Rules for Router B

| VLAN | IP Multicast Rule |
|---|---|
| VLAN B | Route to VLAN D |

FIG. 4D

METHOD AND SYSTEM FOR PROTOCOL INDEPENDENT MULTICASTING IN MULTICHASSIS LINK AGGREGATION DOMAINS

BACKGROUND

One function that is implemented by multilayer switches is protocol independent multicast (PIM). When PIM is implemented on a pair of switches, where the pair of switches appear as a single logical layer-2 switch with separate per-physical switch routing instances, it is important to ensure that multiple Internet Protocol (IP) multicast packets are not delivered to the same destination. Traditionally, in such implementations, proprietary tags are attached to the IP multicast packets by the multilayer switches, where the proprietary tags are used to ensure that multiple copies of the IP multicast packet are not delivered to the same destination. The use of proprietary tags decreases the interoperability of various switches and also makes network trouble shooting difficult.

SUMMARY

In general, in one aspect, the invention relates to a non-transitory computer readable medium comprising instructions, which when executed by at least one processor perform a method for processing Internet Protocol (IP) multicast packets in a multichassis link aggregation (MLAG) domain, the method comprising: receiving, from a first external device, a first IP multicast packet associated with a first Virtual Local Area Network (VLAN) by a first MLAG peer in the MLAG domain, bridging a copy of the IP multicast packet to all external devices in the MLAG domain, other than the first external device, associated with the first VLAN, applying, on the first MLAG peer, a first routing rule to the first IP multicast packet to obtain a new IP multicast packet associated with a second VLAN, bridging a first copy of the new IP multicast packet associated with the second VLAN to all external devices, associated with the second VLAN, that are directly connected to the first MLAG peer, forwarding, via a peer link, a second copy of the new IP multicast packet associated with the second VLAN to the second MLAG peer, wherein the second MLAG peer applies a second routing rule to the second copy of the new IP multicast packet associated with the second VLAN to obtain a second new IP multicast packet associated with a third VLAN, wherein a copy of the second new IP multicast packet associated with the third VLAN is forwarded across the peer link, receiving, via the peer link, a copy of the second new IP multicast packet associated with the third VLAN from the second MLAG peer, and bridging a copy of the second new IP multicast packet associated with the third VLAN to all external devices associated with the third VLAN that are singly connected to the first MLAG peer.

In general, in one aspect, the invention relates to a multichassis link aggregation (MLAG) domain, comprising: a first MLAG peer configured to receive, from a first external device, an IP multicast packet associated with a first Virtual Local Area Network (VLAN), bridge a copy of the IP multicast packet to all external devices in the MLAG domain, other than the first external device, associated with the first VLAN, apply a first routing rule to the first IP multicast packet to obtain a new IP multicast packet associated with a second VLAN, bridge a copy of the new IP multicast packet to each of: all external devices, associated with the second VLAN that are directly connected to the first MLAG peer and a second MLAG peer via a peer link, and the second MLAG peer configured to: receive, via the peer link, one copy of the new IP multicast packet associated with the second VLAN, apply a second routing rule to the one copy of the new IP multicast packet associated with the second VLAN to obtain a second new IP multicast packet associated with a third VLAN, and wherein the first MLAG peer is further configured to: receive, via the peer link, the second new IP multicast packet associated with the third VLAN, and bridge a copy of the second new IP multicast packet associated with the third VLAN to all external devices associated with the third VLAN that are singly connected to the first MLAG peer.

In general, in one aspect, the invention relates to a method for processing Internet Protocol (IP) multicast packets in a multichassis link aggregation (MLAG) domain, the method comprising receiving, from a first external device, a first IP multicast packet associated with a first Virtual Local Area Network (VLAN) by a first MLAG peer in the MLAG domain, bridging a copy of the IP multicast packet to all external devices in the MLAG domain, other than the first external device, associated with the first VLAN, applying, on the first MLAG peer, a first routing rule to the first IP multicast packet to obtain a new IP multicast packet associated with a second VLAN, bridging a first copy of the new IP multicast packet associated with the second VLAN to all external devices, associated with the second VLAN, that are directly connected to the first MLAG peer, forwarding, via a peer link, a second copy of the new IP multicast packet associated with the second VLAN to the second MLAG peer, wherein the second MLAG peer applies a second routing rule to the second copy of the new IP multicast packet associated with the second VLAN to obtain a second new IP multicast packet associated with a third VLAN, wherein a copy of the second new IP multicast packet associated with the third VLAN is forwarded across the peer link, receiving, via the peer link, a copy of the second new IP multicast packet associated with the third VLAN from the second MLAG peer, and bridging a copy of the second new IP multicast packet associated with the third VLAN to all external devices associated with the third VLAN that are singly connected to the first MLAG peer.

Other aspects of the invention will be apparent from the following description and the appended claims.

BRIEF DESCRIPTION OF DRAWINGS

FIGS. 4A-4H show an example in accordance with one or more embodiments of the invention.

DETAILED DESCRIPTION

Specific embodiments of the invention will now be described in detail with reference to the accompanying figures. In the following detailed description of embodiments of the invention, numerous specific details are set forth in order to provide a more thorough understanding of the invention. However, it will be apparent to one of ordinary skill in the art that the invention may be practiced without these specific details. In other instances, well-known features have not been described in detail to avoid unnecessarily complicating the description.

In the following description of FIGS. 1-4H, any component described with regard to a figure, in various embodiments of the invention, may be equivalent to one or more like-named components described with regard to any other figure. For brevity, descriptions of these components will not be repeated with regard to each figure. Thus, each and every embodiment of the components of each figure is incorporated by reference and assumed to be optionally present within every other figure having one or more like-named components. Additionally, in accordance with various embodiments of the invention, any description of the components of a figure is to be interpreted as an optional embodiment which may be implemented in addition to, in conjunction with, or in place of the embodiments described with regard to a corresponding like-named component in any other figure.

In general, embodiments of the invention relate to implementing tagless protocol independent multicasting (PIM) on switches in a multichassis link aggregation (MLAG) domain. More specifically, embodiments of the invention relate to implementing two separate IP multicast routers in a single MLAG domain, where each of the IP multicast routers maintains a separate routing table.

In one or more embodiments of the invention, MLAG is a switch behavior where two switches cooperate to provide the illusion of a single switch for layer-2 purposes (or the illusion of a single 802.1q bridge) from the point of view of any externally connected device. The two switches are called MLAG peers, their union is called the MLAG domain, and the link or links directly connecting them are called the peer link or links. In one embodiment, the switches cooperate to provide the illusion of a single layer-2 Ethernet switch such that external devices may connect using link aggregation groups (LAGs) made up of a set of links where one subset of the links terminates on the first switch, and the remaining links terminate on the second switch. One skilled in the art will recognize that maintaining this illusion requires several distinct types of coordination, including Spanning Tree Protocol (STP) coordination, Link Aggregation Control Protocol (LACP) coordination, MAC Address Learning coordination, and IGMP Snooping coordination.

Figure 1:
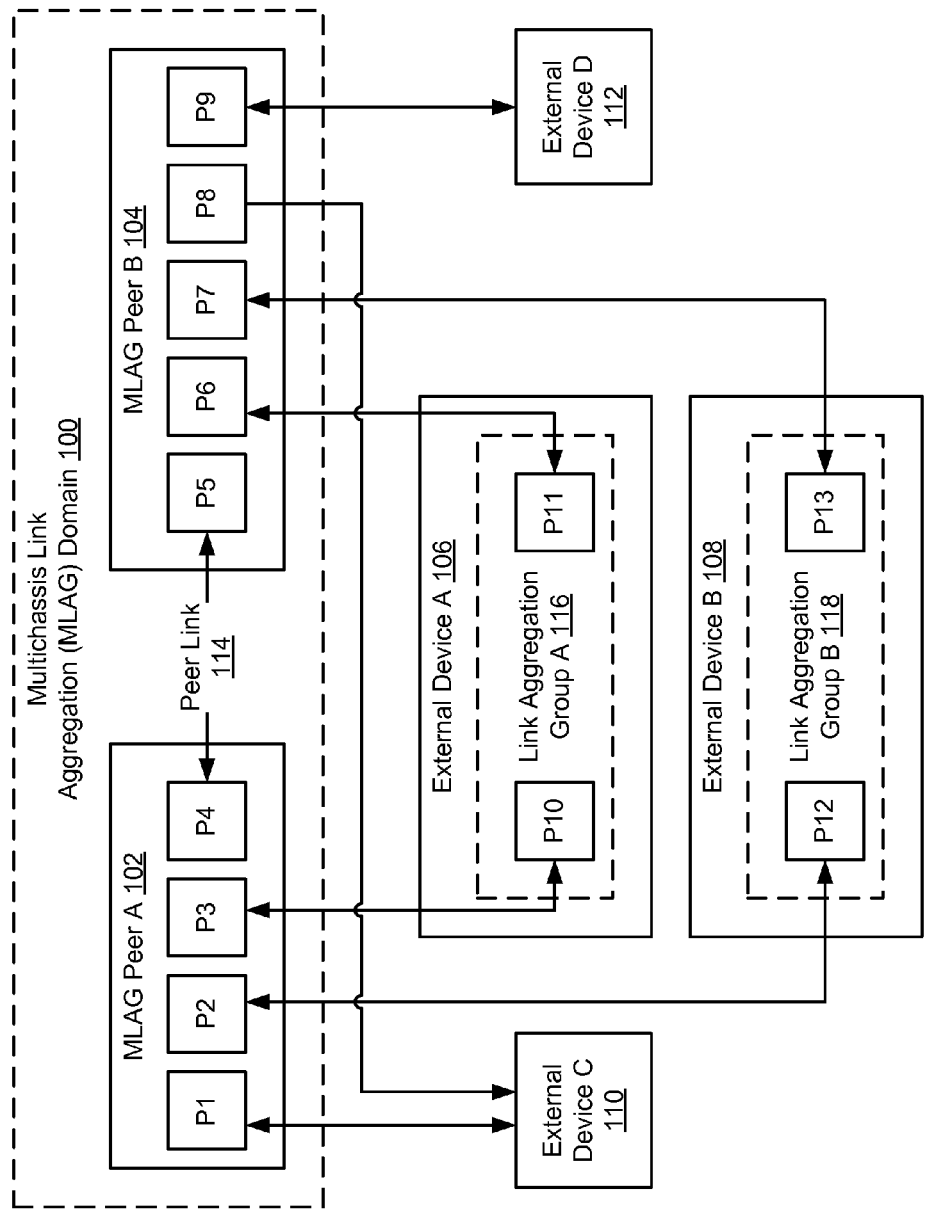
FIG. 1 shows a system in accordance with one or more embodiments of the invention.

FIG. 1 shows a system in accordance with one or more embodiments of the invention. The system includes an MLAG domain (100) and a number of external devices (106, 108, 110, 112). Each of these components is described below.

In one embodiment of the invention, the MLAG domain (100) includes a pair of MLAG peers (102, 104), where each of the MLAG peers (102, 104) is a switch. In one embodiment of the invention, each MLAG peer is a multilayer switch that includes functionality to bridge packets (also referred to a bridging functionality and/or applying a bridging function) (i.e., forward packets using layer 2 addresses) and functionality to route packets (also referred to a bridging functionality and/or applying a routing function) (i.e., forward packets using layer 3 addresses). In one embodiment of the invention, a switch is a physical device that includes persistent storage, memory (e.g., Random Access Memory), one or more processors, and two or more physical ports (e.g., P1-P9). Each port may be connected to either: (i) an MLAG peer or (ii) an external device (106, 108, 110, 112). Ports connected to a MLAG peer may be referred to as peer ports while ports not connected to the MLAG peer may be referred to as non-peer ports.

With respect to the peer ports, each MLAG peer may include one or more peer ports, where the peer ports on one MLAG peer are connected (e.g., via a wired connection) to the peer ports on the other MLAG peer. The result is one or more physical links between the MLAG peers. These links may be collectively referred to as a peer link (114). The peer link (114) may be established and/or active when at least one physical link that is part of the peer link is active. The physical link is considered to be active when peer ports on each side of the physical link are active.

Continuing with the discussion of a switch, each switch is configured to receive packets via the non-peer ports and determine whether to (i) drop the packet, (ii) process the packet as part of a layer-2 control protocol (e.g., Spanning Tree Protocol (STP), Link Aggregation Control Protocol (LACP), Internet Group Management Protocol (IGMP)); or (iii) send the packet out over another one of the ports on the switch. Each of the switches in the MLAG domain may include functionality to (i) bridge packets (i.e., forward packets using layer 2 addresses within a layer 2 domain (discussed below)) and route packets between layer two domains using layer 3 addresses In one embodiment of the invention, the persistent storage in the switch may include any non-transitory computer readable medium that includes instructions, which when executed by the one or more processors in the switch, enable the switch to perform the functions described in this application (see e.g., FIGS. 3A-3B).

In one embodiment of the invention, an external device may be (i) a switch, (ii) a router, (iii) a computer system, or (iv) any other device that is able to connect to at least one port in the MLAG domain. The computer system (with a processor, memory, and persistent storage) may correspond to any type of system that is configured to send and receive packets.

In one embodiment of the invention, each external device may be a singly-connected device or a dually-connected device. A singly-connected device is only connected to a single port on one of the MLAG peers (see e.g., 112). A dually-connected device is connected to at least one port on each of the MLAG peers in the MLAG domain (e.g., 106, 108, 110). If an external device is dually-connected, then the ports on the external device that are connected to the MLAG domain in order to make the external device a dually-connected device are collectively referred to as a link aggregation group (e.g., 116, 118).

In one embodiment of the invention, to external devices that are dually-connected devices, the MLAG domain appears as a single switch. For example, from the perspective of external device A (106) and external device B (108), the MLAG domain appears as a single switch with a media access control (MAC) address (which is different than the MAC addresses of the MLAG peer A (102) and MLAG peer B (104)) and ports P1-P9. Further, based on the above, external device A (106) operates as if port P10 and P11 are connected to the same switch. Similarly, external device B (108) operates as if port P12 and P13 are connected to the same switch.

In order to behave (or at least appear to external devices that are dually-connected) as a single switch, the MLAG domain (100) implements the following functionality: (i) one MLAG peer is designated as a primary switch and one MLAG peer is designated as a secondary switch; (ii) the primary switch is responsible for implementing spanning tree protocol (STP) for the MLAG domain, which includes generating all configuration bridging protocol data unit messages (also referred to a STP configuration messages), issuing the STP configuration messages over one or more ports in the MLAG domain and processing the received STP configuration messages in accordance with STP; (iii) the secondary switch implements its own instance of STP using the STP configuration messages received by the MLAG domain but the results of processing the STP configuration messages are not used while the primary switch is active (see FIG. 3 below); (iv) the MLAG peers share forwarding table information via the peer link such that the MLAG peers have synchronized forwarding tables; (v) the individual MLAG peers each implement their own instance of various layer-2 control protocols such as LACP and IGMP. In one embodiment of the invention, while the individual MLAG peers implement their own instances of LACP the MLAG peers both use the MAC address associated with the MLAG domain (instead of the MAC addresses that are associated with the individual MLAG peers).

In one embodiment of the invention, both MLAG peers are implemented as symmetric MLAG peers (i.e., there is no designation of primary and secondary switches in the MLAG domain). In such embodiments, the MLAG peers both implement symmetric coordinated instances of STP for all non-peer ports on the MLAG peer. Further, each of the MLAG peers implement their own instances of the various layer-2 protocols (as discussed above), coordinating to reach agreement about which ports are members of which LAGs.

Each MLAG peer has a copy of a layer-2 forwarding table called the "MAC table", which is a mapping from MAC address to port. The port is the "location" of the MAC address. With reference to FIG. 1, when a packet enters MLAG Peer A with a destination MAC address of C, if the MAC table maps C to port P1, then MLAG Peer A forwards the packet out port P1. If the same packet enters MLAG Peer B, then MLAG Peer B forwards the packet out port P5 (towards MLAG Peer A) because P1 is part of MLAG Peer A and because MLAG Peer B has no way to get a packet to C directly.

Note that the MAC table may map a MAC address to a link aggregation group (LAG). For example, if the MAC table maps MAC address A to LAG A, then MLAG Peer A would forward a packet with a destination address of MAC address A out port P3, whereas MLAG Peer B would forward such a packet out port P6.

Each MLAG peer updates its copy of the MAC table based on the source MAC addresses of received packets, communicating with the other MLAG peer as needed to keep the MAC tables in sync. In other words, the MAC tables of MLAG peers are the same except during a slight communication delay as a MAC table update propagates from one peer to the other. For example, when MLAG Peer B receives a packet on port P9 with a MAC source address of D, it updates its MAC table to map MAC source address D to P9, and propagates that mapping in a message sent to MLAG Peer A. This process is called "source learning". No source learning takes place for packets received on the peer link (ports P4 and P5), as the "true" (external) location is determined through MAC table update propagation.

When a packet's destination is not found in the MAC table, the switch must flood the packet. For example, if a packet entered port P1 with a destination MAC address of B, and there is no entry in the MAC table that maps MAC address B to a port, then MLAG Peer A would forward the packet out ports P2, P3, and P4. When the packet enters MLAG Peer B, it sends the packet out port P9 only. Because MLAG Peer B received the packet on the peer link, it sends no copy out ports P6, P7, or P8, because those ports are members of LAGs with members on the other peer, and thus it is the other peer's responsibility to ensure that the LAG received a copy if needed. In one or more embodiments of the invention, the general rule is that packets received on external ports are flooded out all other external ports and the peer link, whereas packets received on the peer link are flooded out only external ports that are not members of LAGs that include members on the peer switch.

Those skilled in the art will appreciate that packet transmission in all cases is subject to VLAN membership tests, STP topology tests, access control lists (ACLs), shapers, policies, queue occupancy and buffering limitations, IGMP snooping group membership test, and various other well-known mechanisms that influence packet forwarding decisions.

Though not shown in FIG. 1, in addition to the switching functionality described above, each MLAG peer implements an IP multicast router. The IP multicast router within the MLAG peer, may be implemented in software, hardware, or any combination thereof. Additional details about the IP multicasting functionality are described below.

The invention is not limited to the system configuration shown in FIG. 1.

Figure 2:
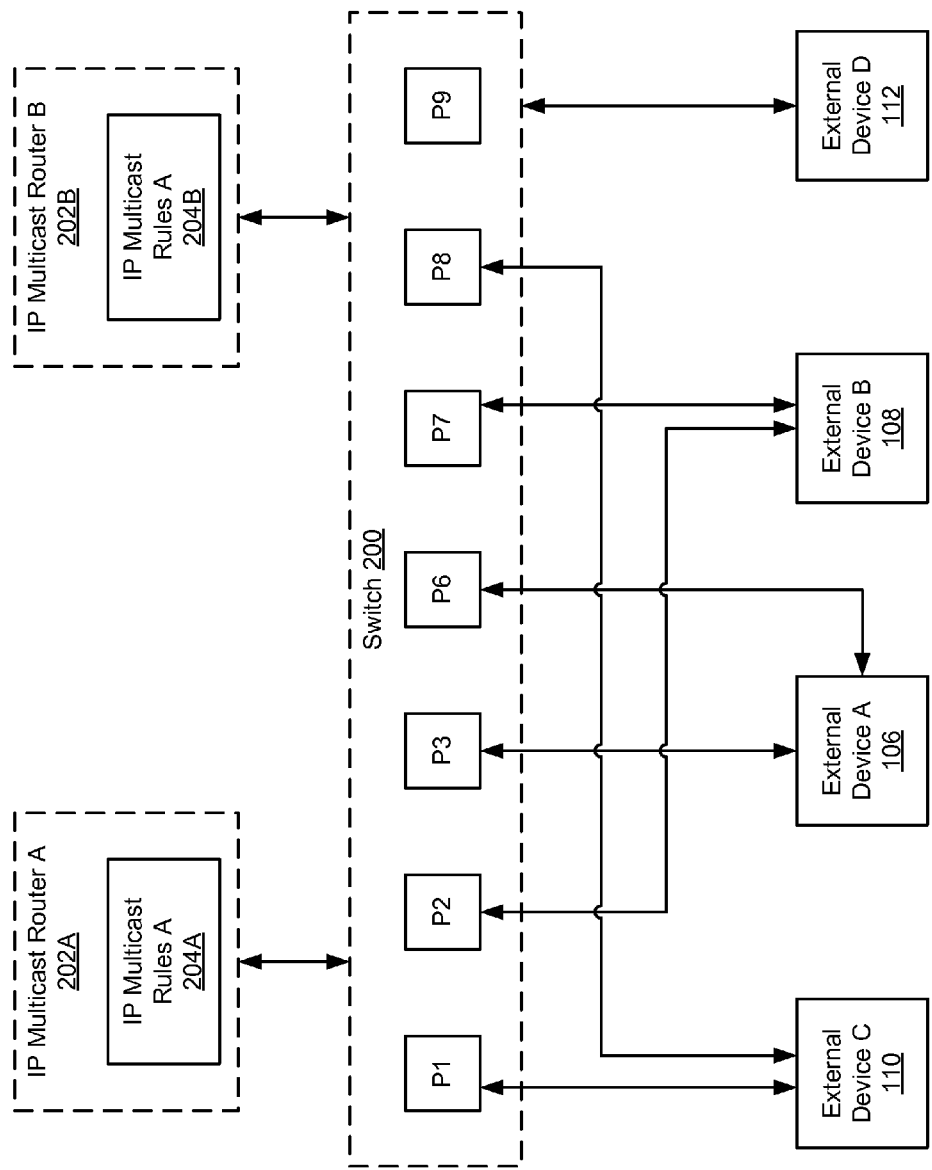
FIG. 2 shows a logical view of a multichassis link aggregation (MLAG) domain in accordance with one or more embodiments of the invention.

FIG. 2 shows a logical view of a multichassis link aggregation (MLAG) domain with the IP multicast routers in accordance with one or more embodiments of the invention. More specifically, FIG. 2 shows the view of the MLAG domain from the perspective of the external devices. Specifically, as shown in FIG. 2, to each of the external devices (106, 108, 110, 112), there appears to be a single switch (i.e., switch (200)) that is connected to two separate IP multicast routers (i.e., IP multicast router (202A), IP multicast router (202B)). With respect to the IP multicast routers, each of the IP multicast routers (202A, 202B) includes its own IP multicast rules (204A, 204B). The IP multicast rules specify how IP multicast packets from one virtual local area network (VLAN) may be routed to another VLAN. The IP multicast rules may include rules for multiple different VLANs.

Those skilled in the art will appreciate that the multicast routing function may route between any set of layer-3 interfaces, including routed ports and tunnel interfaces. This description focuses on VLAN interfaces only for simplicity.

In one embodiment of the invention, each of the IP multicast routers implements PIM as defined in RFC 4601 ("Protocol Independent Multicast—Sparse Mode (PIM-SM): Protocol Specification (Revised)", August 2006), RFC 3973 ("Protocol Independent Multicast—Dense Mode (PIM-DM): Protocol Specification (Revised)", December 2005), RFC 5015 ("Bidirectional Protocol Independent Multicast (BIDIR-PIM)", October 2007), and/or RFC 3569 ("An Overview of Source-Specific Multicast (SSM)", July 2003). The IP multicast routers may also implement any other multicast routing protocol without departing from the invention.

The following discussion describes how IP multicast packets associated with a VLAN that are received by an MLAG peer are processed. Specifically, FIG. 3A describes how the first MLAG peer to receive the IP multicast packet from an external device processes the IP multicast packet—where the processing includes a combination of bridging and routing. FIG. 3B describes how the second MLAG peer (i.e. the MLAG peer that did not receive the IP multicast packet from the external device) processes IP multicast packets it receives via the peer link (114 in FIG. 1).

Figure 3A:
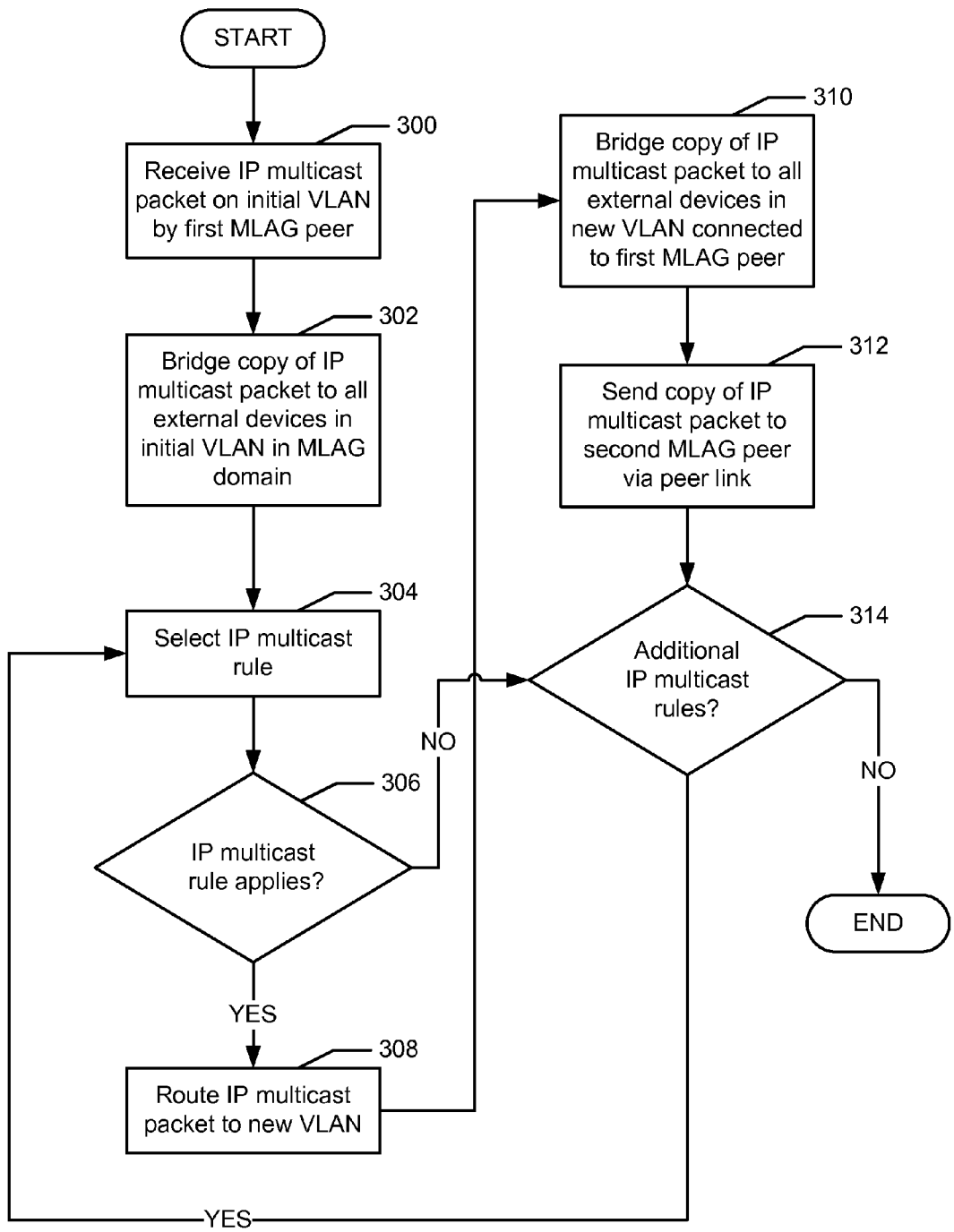
FIGS. 3A-3B show flowcharts for processing Internet Protocol (IP) multicast packets in an MLAG domain in accordance with one or more embodiments of the invention.
Figure 3B:
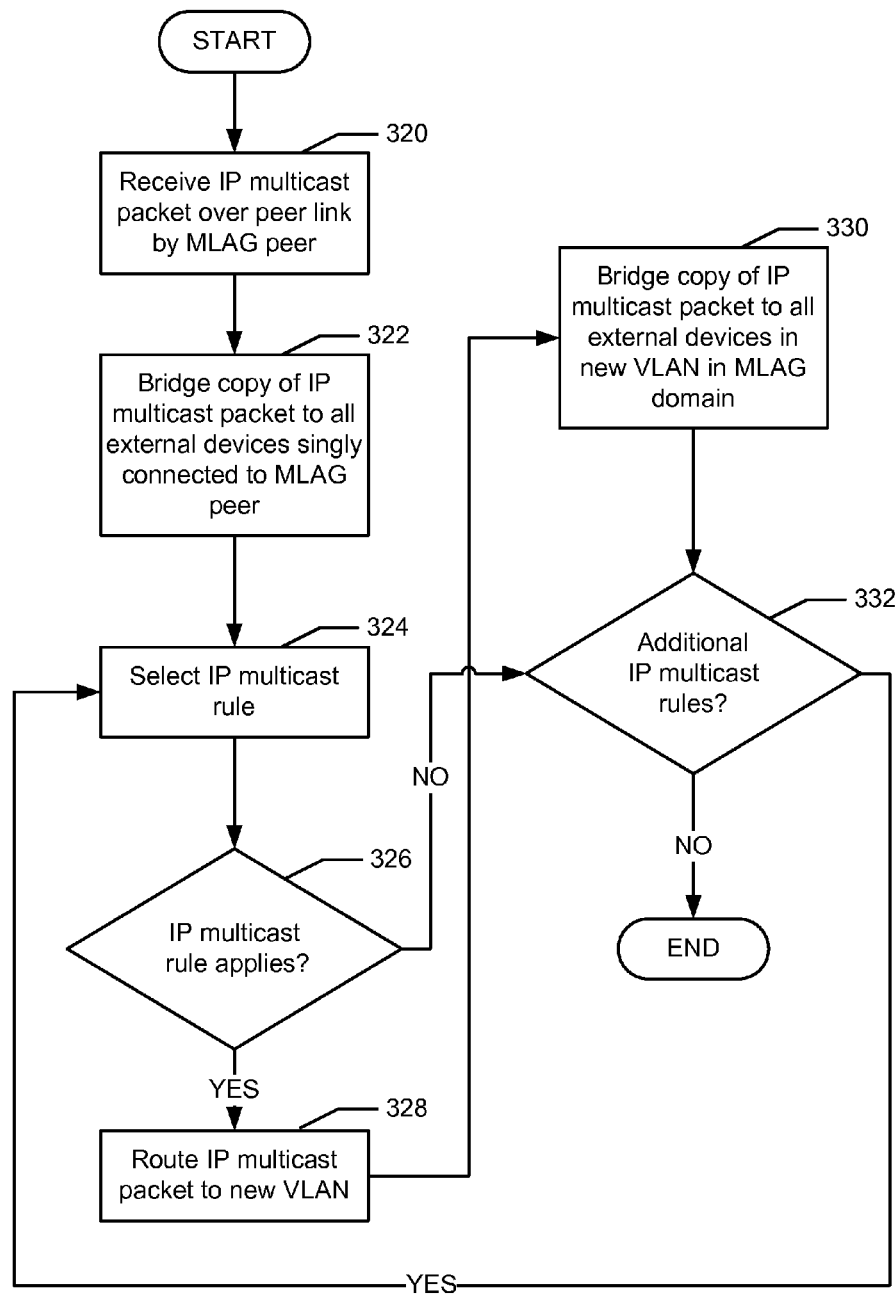

Turning to FIGS. 3A-3B, FIGS. 3A-3B show flowcharts in accordance with one or more embodiments of the invention. While the various steps in the flowcharts are presented and described sequentially, one of ordinary skill will appreciate that some or all of the steps may be executed in different orders, may be combined or omitted, and some or all of the steps may be executed in parallel. In one embodiment of the invention, the steps shown in FIGS. 3A-3B may be performed in parallel with any other steps shown in FIGS. 3A-3B without departing from the invention.

Turning to FIG. 3A, FIG. 3A shows a flowchart for processing Internet Protocol (IP) multicast packets in an MLAG domain in accordance with one or more embodiments of the invention. In step 300, an IP multicast packet is received by one of the MLAG peers (denoted as the first MLAG peer in FIGS. 3A-3B) in the MLAG domain. The IP multicast packet is formatted in accordance with the multicast routing protocol that is implemented by the MLAG peer. In one embodiment of the invention, the IP multicast packet is associated with a VLAN (which is denoted as the initial VLAN in FIGS. 3A-3B).

In step 302, a copy of the IP multicast packet (with any appropriate rewrites to the layer 2 header) is bridged to all external devices in the MLAG domain that are associated with the initial VLAN. In one embodiment of the invention, the aforementioned bridging includes (i) bridging a copy of the IP multicast packet (with any appropriate rewrites to the layer 2 header) to all external devices that are directly connected (i.e., singly connected and doubly connected external devices) to the first MLAG peer and (ii) bridging a copy of the IP multicast packet (with any appropriate rewrites to the layer 2 header) across the peer link to the second MLAG peer (i.e., the other MLAG peer in the MLAG domain), where the second MLAG peer subsequently bridges a copy of the IP multicast packet (with any appropriate rewrites to the layer 2 header) to all external devices that are singly connected to the second MLAG peer. In one embodiment of the invention, the functionality of the first MLAG peer to bridge a copy of IP multicast packets to all external devices in the MLAG domain in the initial VLAN is performed by a bridging function in the first MLAG peer.

Prior to step 304, a copy of the IP multicast packet is also forwarded to the IP multicast router in the first MLAG peer. This step may not be performed in the scenario in which the same copy of the IP multicast packet received in Step 300 is processed by both the bridging function (i.e., the functionality that bridge a packet to an port of the MLAG peer, see e.g., Step 302) and the routing function (i.e., the functionality to route the packet from a source VLAN to a destination VLAN, see e.g., Step 308). In step 304, an IP multicast rule is selected, where the IP multicast rule corresponds to one of the IP multicast rules stored in (or otherwise associated with) the IP multicast router in the first MLAG peer. In step 306, a determination is made about whether the IP multicast rule applies. In one embodiment of the invention, the IP multicast rule applies when the rule specifies how to route packets that are received on the initial VLAN.

In step 308, if the IP multicast rule applies, the IP multicast packet is routed to the new VLAN. In one embodiment of the invention, routing the IP multicast packet results in the generation of a new IP multicast packet that includes the same payload as the IP multicast packet received in Step 300, but has updated headers and a different VLAN tag. In particular, the new IP multicast packet includes a VLAN tag corresponding to the new VLAN and may also include updated layer 2 headers to reflect that the first MLAG peer is the source for the IP multicast packet. In one embodiment of the invention, step 308 is performed by the IP multicast router on the first MLAG peer. In step 310, a copy of the new IP multicast packet (with any appropriate rewrites to the layer 2 header and layer 3 header) is bridged to all external devices in the new VLAN (i.e., the VLAN to which the IP multicast packet was routed in Step 308) that are directly connected to the first MLAG peer. More specifically, a copy of the new IP multicast packet is forwarded to the bridging function in the first MLAG peer. The bridging function subsequently bridges a copy of the new IP multicast packet to all external devices in the new VLAN that are directly connected to the first MLAG peer.

In step 312, a copy of the new IP multicast packet (with any appropriate rewrites to the layer 2 header and layer header) is sent to the second MLAG peer via the peer link. In one embodiment of the invention, the copy of the new IP multicast packet may be forwarded to the bridging function in the first MLAG peer. The first MLAG peer, via the bridging function, may then bridge a copy of the new IP multicast packet to the second MLAG peer. In another embodiment of the invention, the bridging function may generate a copy of the new IP packet (based on the routed IP multicast packet it received in step 310) and bridge copy of the new IP multicast packet to the second MLAG peer. In another embodiment of the invention, the IP multicast router in the first MLAG peer may directly send a copy of the new IP multicast packet to the second MLAG peer. In one embodiment of the invention, the second MLAG processes the copy of the new IP multicast packet in accordance with FIG. 3B.

In step 314, a determination is made about whether there are any additional IP multicast rules to apply. If there are additional IP multicast rules to apply, the process proceeds to step 304; otherwise, the process ends.

Turning to FIG. 3B, FIG. 3B shows a flowchart for processing an IP multicast packets received by an MLAG peer in an MLAG domain via a peer link in accordance with one or more embodiments of the invention. The IP multicast packets received via the peer link may be IP multicast packets that are directly bridged from the first MLAG peer (i.e., the IP multicast packets include a MAC address of an external device, e.g., external device a (105 in FIG. 1), as the source MAC address). The IP multicast packets received via the peer link may also include IP multicast packets that are routed and then bridged from the first MLAG peer (i.e., the IP multicast packets include a MAC address of a first MLAG peer as the source MAC address).

Similar to the first MLAG peer, the second MLAG peer processes the IP multicast packets received via the peer link using: (i) only the bridging function, see e.g., Step 322 and (ii) a routing function and a subsequently a bridging function, see e.g., Steps 324-330.

In step 320, an IP multicast packet is received via the peer link from the first MLAG peer. In step 322, a copy of the IP multicast packet (with any appropriate rewrites to the layer 2 header) is bridged to all external devices that are singly connected to the second MLAG peer and that are in the same VLAN as the IP multicast packet received via the peer link. In one embodiment of the invention, step 322 is performed at least in part by a bridging function.

In step 324, an IP multicast rule is selected, where the IP multicast rule corresponds to the IP multicast rules stored in (or otherwise associated with) the IP multicast router in the second MLAG peer. In step 326, a determination is made about whether the IP multicast rule applies. In one embodiment of the invention, the IP multicast rule applies when the rule specifies how to route packets that are received on the VLAN associated with the routed IP multicast packet received in Step 320. In one embodiment of the invention, the IP multicast rule applies if the rule specifies how to route packets on the packet's ingress VLAN and if the group address of the packet matches the group address of the rule. In one embodiment of the invention, the IP multicast rule applies if the rule specifies how to route packets on the packet's ingress VLAN and, for (S, G) pair multicast rules, if the IP source address of the packet matches the source address for the rule, where "S" is the IP source address of the multicast packet and "G" is the multicast group to which the packet is sent.

In step 328, if the IP multicast rule applies, the IP multicast packet (i.e., the IP multicast packet received in Step 320 or a copy of the IP multicast packet received in Step 320) is routed to the new VLAN. In one embodiment of the invention, routing the IP multicast packet results in the generation of a new IP multicast packet that includes the same payload as the IP multicast packet received in Step 320, but has updated headers and a different VLAN tag. The new IP multicast packet includes a VLAN tag corresponding to the new VLAN and may also include updated layer 2 headers to reflect that the second MLAG peer is the layer-2 source for the routed IP multicast packet. In one embodiment of the invention, step 328 is performed by the IP multicast router on the second MLAG peer.

In step 330, a copy of the new IP multicast packet (with any appropriate rewrites to the layer 2 header) generated in Step 328 is bridged to all external devices in the MLAG domain that are associated with the new VLAN (i.e., the new VLAN to which the routed IP multicast packet was routed in Step 328). In one embodiment of the invention, the functionality of the second MLAG peer to bridge a copy of IP multicast packets to all external devices in the MLAG domain in the new VLAN is performed by a bridging function in the second MLAG peer. In one embodiment of the invention, the aforementioned bridging includes (i) bridging a copy of the new IP multicast packet (with any appropriate rewrites to the layer 2 header) to all external devices that are directly connected (i.e., singly connected and doubly connected external devices) to the second MLAG peer and (ii) bridging a copy of the new IP multicast packet (with any appropriate rewrites to the layer 2 header) across the peer link to the first MLAG peer (i.e., the other MLAG peer in the MLAG domain), where the first MLAG peer subsequently bridges (using its bridging function) a copy of the new IP multicast packet (with any appropriate rewrites to the layer 2 header) to all external devices that are singly connected to the first MLAG peer.

In step 332, a determination is made about whether there are any additional IP multicast rules to apply. If there are additional IP multicast rules to apply, the process proceeds to step 324; otherwise, the process ends.

FIGS. 4A-4H show an example in accordance with one or more embodiments of the invention. The example is not intended to limit the scope of the invention.

Figure 4A:
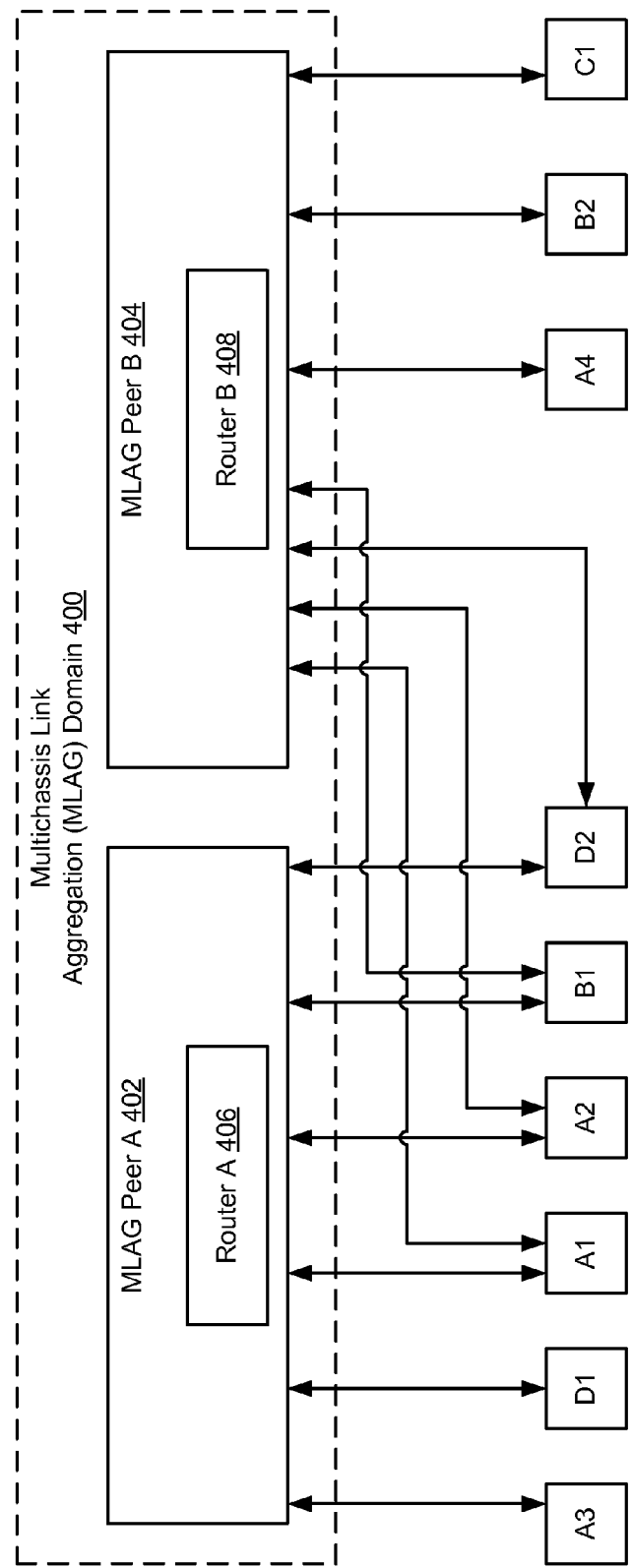

Referring to FIG. 4A, FIG. 4A shows an exemplary system that includes an MLAG domain (400) configured to implement one or more embodiments of the invention. External devices A1-A4, B1-B2, C1, and D1-D2 are connected to the MLAG domain. More specifically, external devices A1, A2, B1, and D2 are connected to both MLAG peers, external devices, A3 and D1 are singly connected to MLAG Peer A (402), and external devices A4, B2, and C1 are singly connected to MLAG Peer B (404). Each of the MLAG peers (402, 404) includes its own instance of an IP multicast router (router A, (406), router B (408), where each of the routers includes its own IP multicast rules (see FIGS. 4C-4D).

Referring to FIG. 4B, for purposes of this example external devices A1-A4 are associated with VLAN A, external devices B1-B2 are associated with VLAN B, external device C1 is associated with VLAN C, and external devices D1 and D2 are associated with VLAN D.

Referring to FIG. 4C, FIG. 4C shows the IP multicast rules for a certain (S, G) pair for Router A (406 in FIG. 4A). For purposes of this example, the only IP multicast rules shown in FIG. 4C correspond to the IP multicast rules for processing IP multicast packets received on VLAN A. Specifically, router A includes two IP multicast rules for processing IP multicast packets received on VLAN A, namely, (i) route IP multicast packets received on VLAN A to VLAN B, and (ii) route IP multicast packets received on VLAN A to VLAN C. Router A does not include any IP multicast rules for routing IP multicast packets received on VLAN A to VLAN D.

Referring to FIG. 4D, FIG. 4D shows the IP multicast rules for Router B (408 in FIG. 4A). For purposes of this example, the only IP multicast rules shown in FIG. 4D correspond to the IP multicast rules for processing IP multicast packets received on VLAN B. Specifically, router B includes the following IP multicast rule for processing IP multicast packets received on VLAN B, namely, route IP multicast packets received on VLAN B to VLAN D. Router B does not include any other IP multicast rules.

Figure 4E:
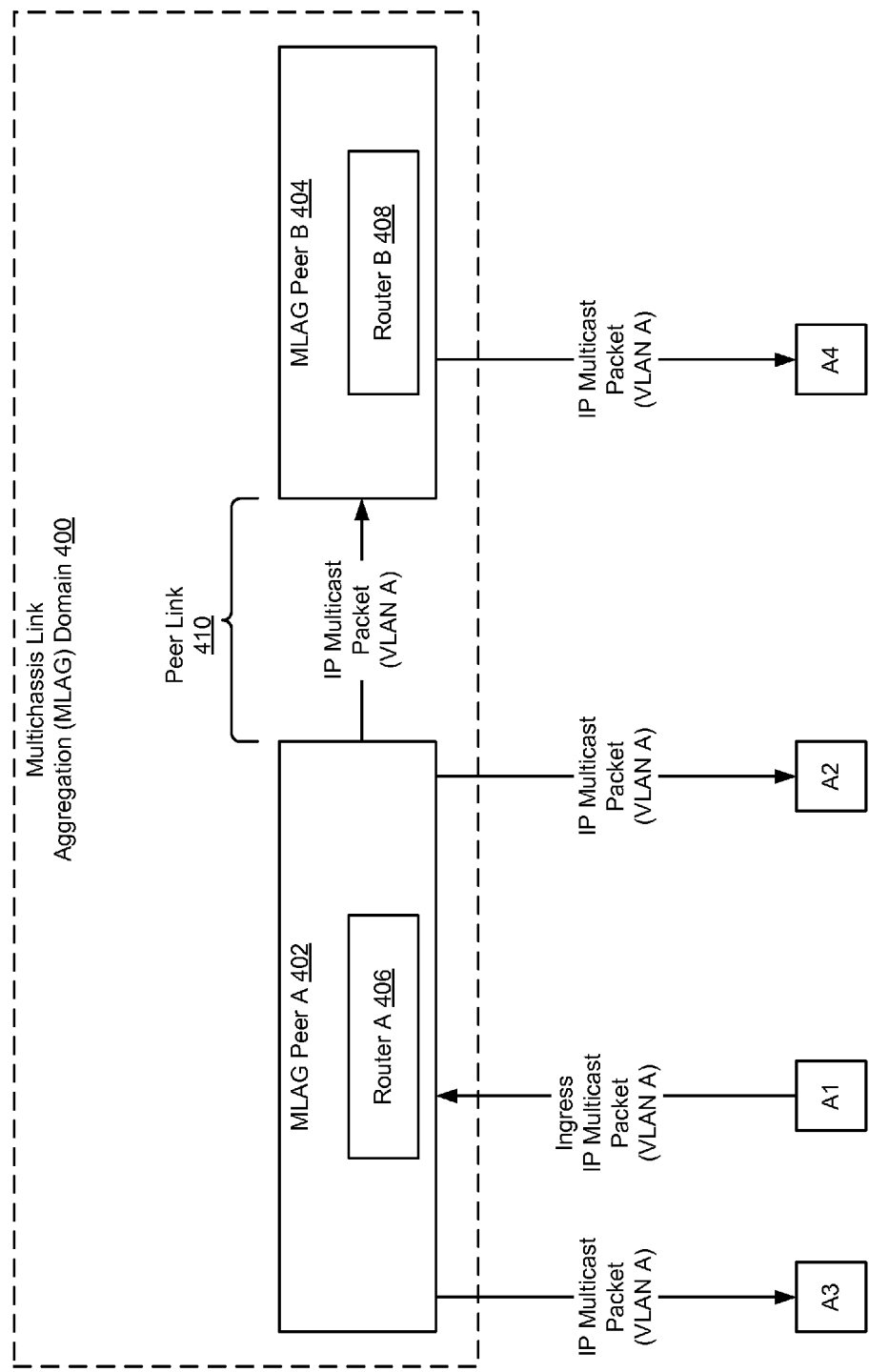
Figure 4F:
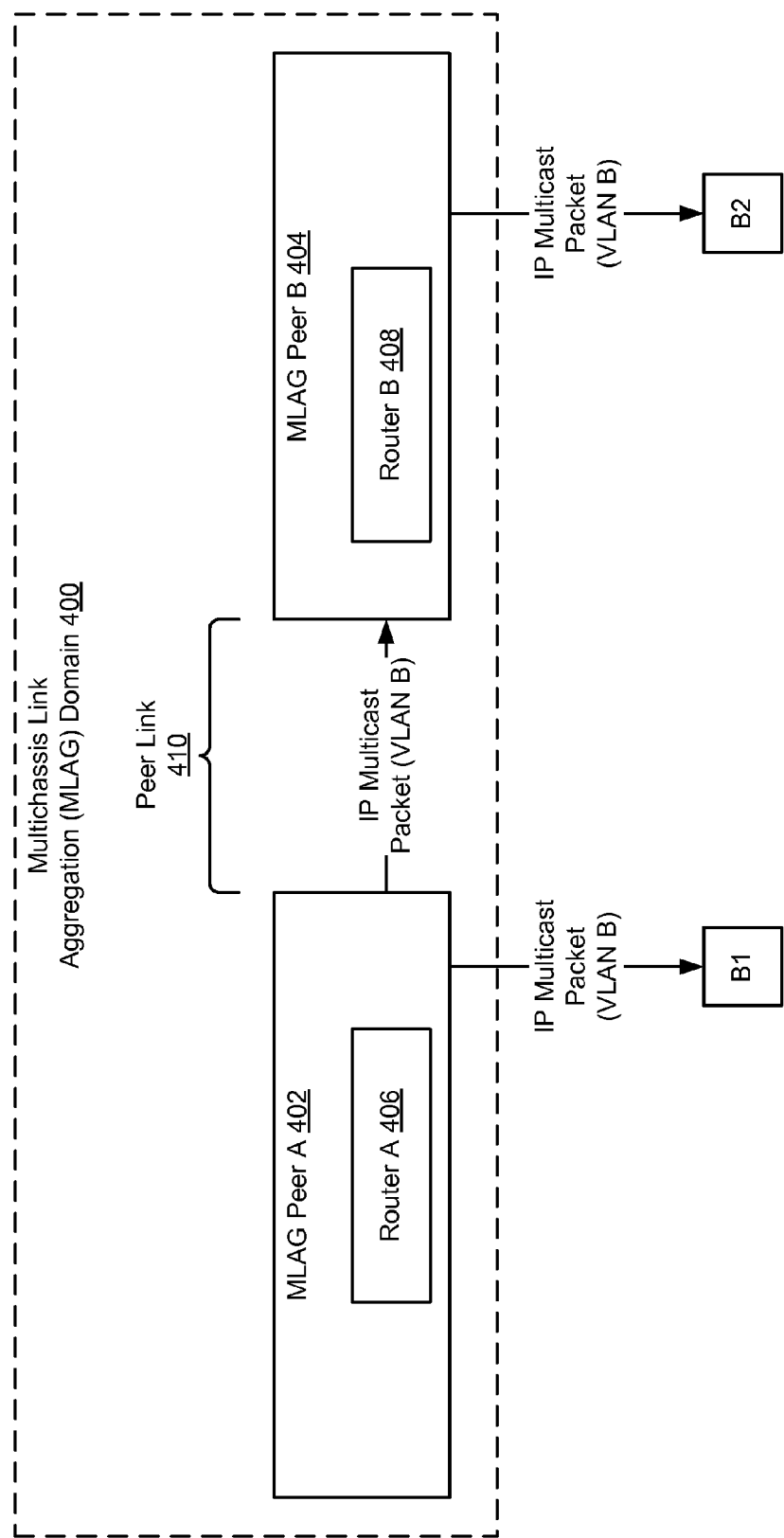
Figure 4G:
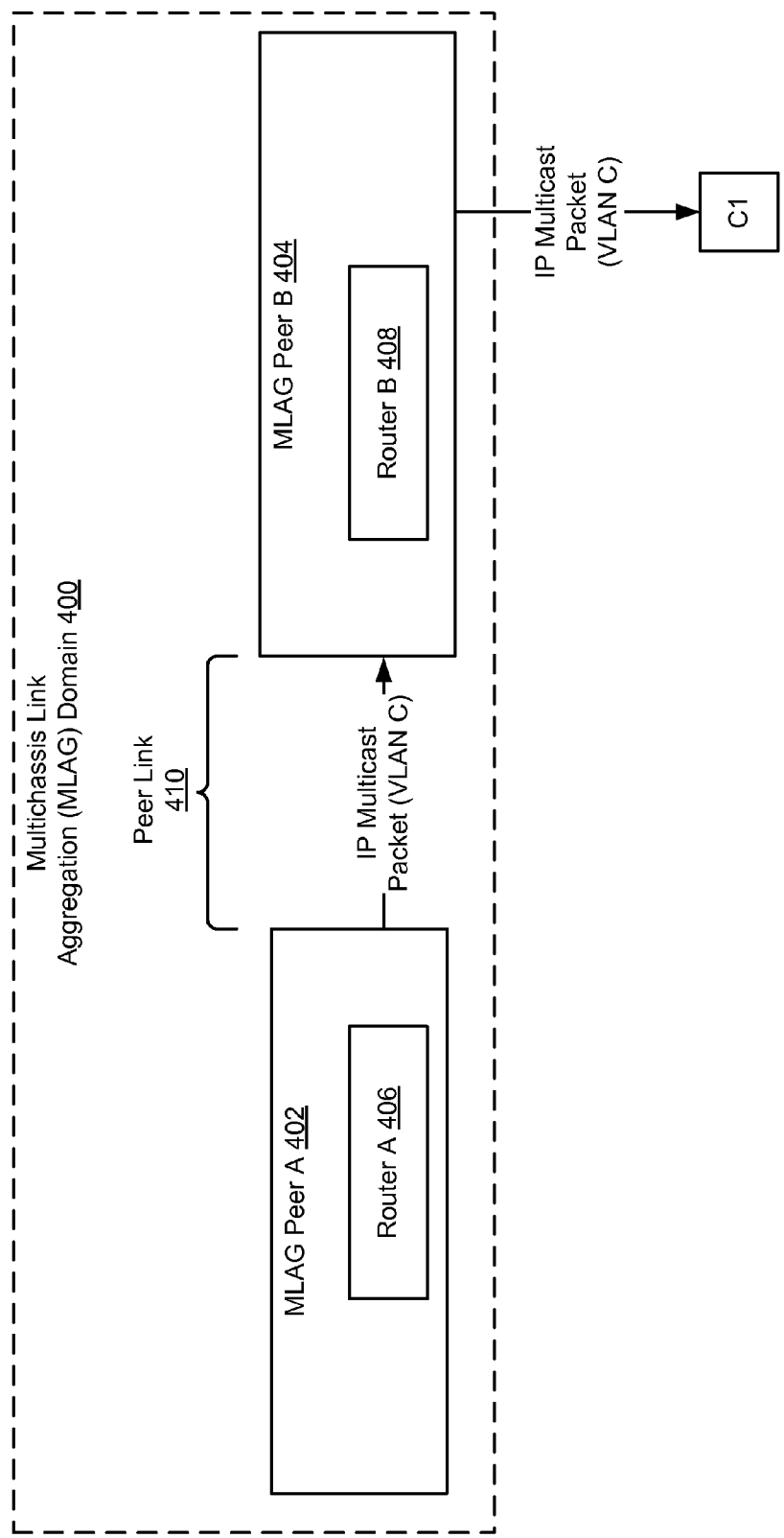
Figure 4H:
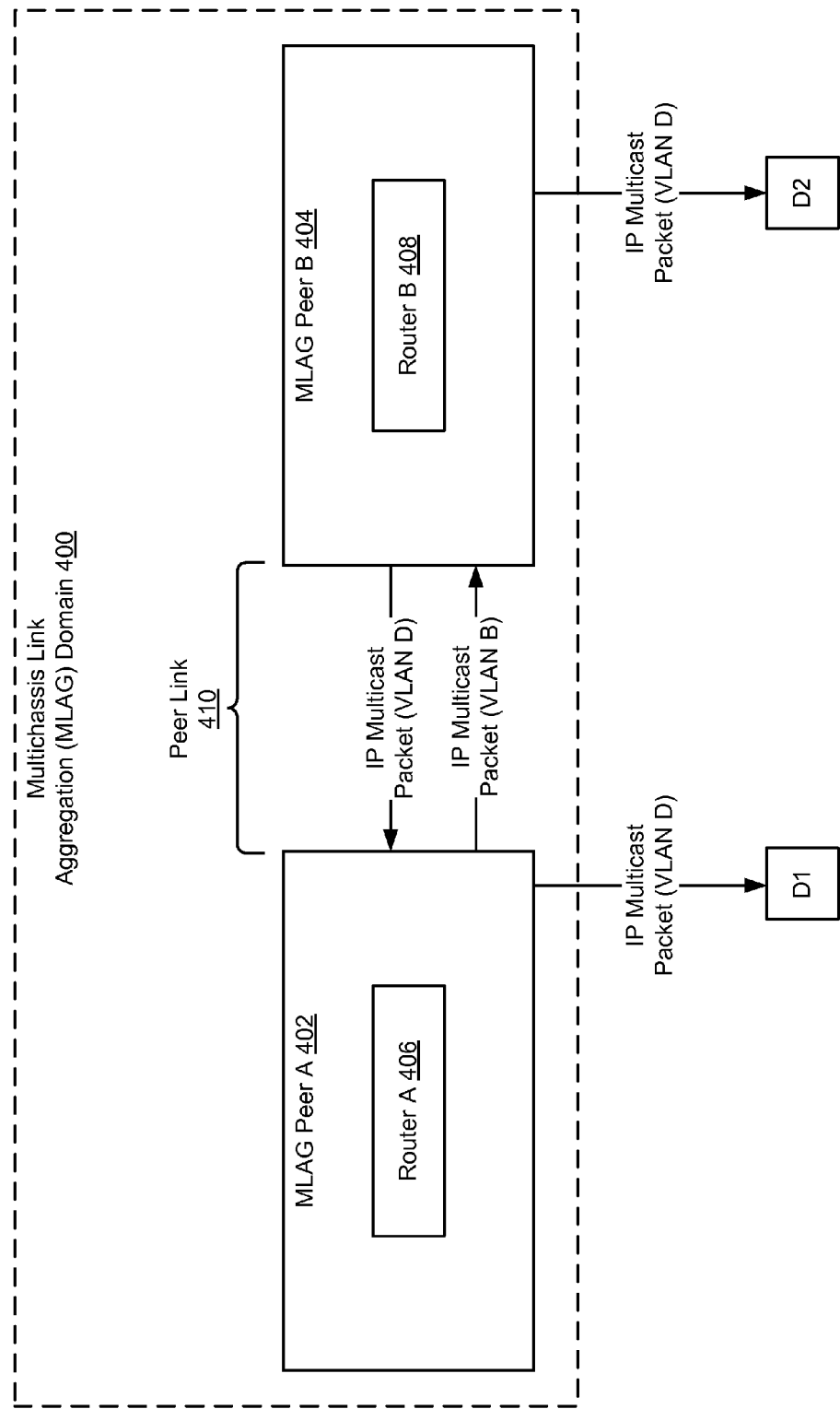

Based on the above configuration shown in FIGS. 4A-4D, consider a scenario in which an IP multicast packet is received by MLAG Peer A (402) from external device A1, where the received IP multicast packet is processed by the MLAG domain in accordance with one or more embodiments of the invention. FIGS. 4E-4H show how IP multicast packets are processed by the MLAG peers and the IP multicast routers within the MLAG peers. For purposes of clarity, each of FIGS. 4E-4H shows processing on a per VLAN basis. Specifically, FIG. 4E shows how the IP multicast packets are processed with respect to VLAN A, FIG. 4F shows how the IP multicast packets are processed with respect to VLAN B, FIG. 4G shows how the IP multicast packets are processed with respect to VLAN C, and FIG. 4H shows how the IP multicast packets are processed with respect to VLAN D.

Turning to FIG. 4E, an IP multicast packet is received by MLAG Peer A from external device A1. As discussed in FIG. 3A above, an IP multicast packet is bridged to all external devices in VLAN A. With respect to this example, a copy of the IP multicast packet is bridged to the external devices A2 and A3 by MLAG peer A. Further, an IP multicast packet (i.e., the same IP multicast packet that was received from A1) is forwarded via the peer link (410) to MLAG peer B. MLAG peer B subsequently bridges the IP multicast packet to external device A4. Because there is not IP multicast rule in router B for routing IP packets received from VLAN A, the IP multicast packet sent by MLAG peer A via the peer link are only bridged to singly-connected external devices in VLAN A and are not routed.

Turning to FIG. 4F, as discussed in FIG. 3A, router A also processes the IP multicast packet received from A1 Specifically, Router A attempts to apply an IP multicast rule (as shown in FIG. 4C). In this example there is an IP multicast rule to route IP multicast packets from VLAN A to VLAN B. Accordingly, Router A routes the IP multicast packet to VLAN B. The result of the routing is a new IP multicast packet in VLAN B. The bridging functioning in MLAG peer A subsequently processes the new IP multicast packet. Specifically, the bridging function (i) bridges a copy of the new IP multicast packet in VLAN B to external device B1 and (ii) forwards a copy of the new IP multicast packet in VLAN B to MLAG peer B via the peer link. Router B subsequently processes the copy of the new IP multicast packet in VLAN B in accordance with FIG. 3B (see FIG. 4H). Further, the bridging function in MLAG peer B bridges a copy of the new IP multicast packet in VLAN B to external device B2.

Turning to FIG. 4G, as previously discussed, Router A attempts to apply one or more IP multicast rules (as shown in FIG. 4C). In this example there is an IP multicast rule to route IP multicast packets from VLAN A to VLAN C. Accordingly, Router A routes the IP multicast packet to VLAN C. The result of the routing is a new IP multicast packet in VLAN C. The bridging function in MLAG peer A subsequently processes the new IP multicast packet in VLAN C, which results in a copy of the new IP multicast packet in VLAN C being forwarded to MLAG peer B via the peer link. Router B subsequently processes the copy of the new IP multicast packet in VLAN C in accordance with FIG. 3B; however, because there is no IP multicast rule for new IP multicast packets received on VLAN C to another VLAN, Router B takes no further action with respect to routing a copy of the new IP multicast packet in VLAN C. The new IP multicast packet in VLAN C is also processed by the bridging function in MLAG peer B. Specifically, the bridging function in MLAG peer B bridges a copy of the new IP multicast packet in VLAN C to external device C1.

Turning to FIG. 4H, as discussed above, a copy of the IP Multicast packet received on VLAN A is forwarded to router A in MLAG Peer A. Router A subsequently attempts to apply an IP multicast rule (as shown in FIG. 4C). In this example there is no IP multicast rule to route IP multicast packets from VLAN A to VLAN D. Accordingly, Router A takes no further action with respect to processing the IP multicast packet with respect to VLAN D. Further, even though external devices D1 and D2 are connected to MLAG peer A, MLAG peer A does not bridge copies of the IP multicast packet in VLAN A to these external devices because MLAG peer A is unable to route the IP multicast packet in VLAN A to VLAN D.

However, as discussed above in FIG. 4F, router B receives a new IP multicast packet in VLAN B via the peer link. Router B subsequently processes the copy of the new IP multicast packet in VLAN B in accordance with FIG. 3B (see FIG. 4H). Specifically, per the IP multicast rules (see FIG. 4D), router B routes the IP multicast packet to VLAN D. The result of the routing is a new IP multicast packet in VLAN D. The bridging function in MLAG peer B subsequently receives the new IP multicast packet in VLAN D and (i) bridges a copy of the new IP multicast packet in VLAN D to external device D2 and (ii) forwards a copy of the new IP multicast packet in VLAN D to MLAG peer A via the peer link. MLAG peer A subsequently bridges the new IP multicast packet in VLAN D to external device D1. Because the there is no IP multicast rule in Router A to route IP packets from VLAN D to another VLAN, the new IP multicast packet in VLAN D sent by MLAG peer B via the peer link is only bridged to external device D1.

One or more embodiments of the invention may be implemented using instructions executed by one or more processors in the system. Further, such instructions may correspond to computer readable instructions that are stored on one or more non-transitory computer readable mediums.

While the invention has been described with respect to a limited number of embodiments, those skilled in the art, having benefit of this disclosure, will appreciate that other embodiments can be devised which do not depart from the scope of the invention as disclosed herein. Accordingly, the scope of the invention should be limited only by the attached claims.

What is claimed is:

1. A non-transitory computer readable medium comprising instructions, which when executed by at least one processor perform a method for processing Internet Protocol (IP) multicast packets in a multichassis link aggregation (MLAG) domain, the method comprising:
   receiving, from a first external device, a first IP multicast packet associated with a first Virtual Local Area Network (VLAN) by a first MLAG peer in the MLAG domain;
   bridging a copy of the IP multicast packet to all external devices in the MLAG domain, other than the first external device, associated with the first VLAN;
   applying, on the first MLAG peer, a first routing rule to the first IP multicast packet to obtain a new IP multicast packet associated with a second VLAN;
   bridging a first copy of the new IP multicast packet associated with the second VLAN to all external devices, associated with the second VLAN, that are directly connected to the first MLAG peer;
   forwarding, via a peer link, a second copy of the new IP multicast packet associated with the second VLAN to the second MLAG peer, wherein the second MLAG peer applies a second routing rule to the second copy of the new IP multicast packet associated with the second VLAN to obtain a second new IP multicast packet associated with a third VLAN, wherein a copy of the second new IP multicast packet associated with the third VLAN is forwarded across the peer link;
   receiving, via the peer link, a copy of the second new IP multicast packet associated with the third VLAN from the second MLAG peer; and
   bridging a copy of the second new IP multicast packet associated with the third VLAN to all external devices associated with the third VLAN that are singly connected to the first MLAG peer.

2. The non-transitory computer readable medium of claim 1, wherein the first MLAG peer and the second MLAG peer are multilayer switches.

3. The non-transitory computer readable medium of claim 1, wherein bridging the copy of the IP multicast packet to all external devices in the MLAG domain comprises forwarding at least one copy of the IP multicast packet to the second MLAG domain via the peer link.

4. The non-transitory computer readable medium of claim 1, wherein the first MLAG peer does not include any routing rules to route IP Multicast packets from the first VLAN to the third VLAN, wherein the first MLAG peer does not include any routing rules to route IP Multicast packets from the second VLAN to the third VLAN, wherein the second MLAG peer does not include any routing rules to route IP multicast packets from the first VLAN to the second VLAN, and wherein the second MLAG peer does not include any routing rules to route IP multicast packets from the first VLAN to the third VLAN.

5. A multichassis link aggregation (MLAG) domain, comprising:
   a first MLAG peer configured to:
      receive, from a first external device, an IP multicast packet associated with a first Virtual Local Area Network (VLAN),
      bridge a copy of the IP multicast packet to all external devices in the MLAG domain, other than the first external device, associated with the first VLAN,
      apply a first routing rule to the first IP multicast packet to obtain a new IP multicast packet associated with a second VLAN,
      bridge a copy of the new IP multicast packet to each of: all external devices, associated with the second VLAN that are directly connected to the first MLAG peer and a second MLAG peer via a peer link; and
   the second MLAG peer configured to:
      receive, via the peer link, one copy of the new IP multicast packet associated with the second VLAN;
      apply a second routing rule to the one copy of the new IP multicast packet associated with the second VLAN to obtain a second new IP multicast packet associated with a third VLAN; and
   wherein the first MLAG peer is further configured to:
      receive, via the peer link, the second new IP multicast packet associated with the third VLAN; and
      bridge a copy of the second new IP multicast packet associated with the third VLAN to all external devices associated with the third VLAN that are singly connected to the first MLAG peer.

6. The MLAG domain of claim 5, wherein the first MLAG peer and the second MLAG peer are each multilayer switches.

7. The MLAG domain of claim 5, wherein the second MLAG peer is further configured to:
bridge a copy of the new IP multicast packet associated with the second VLAN to all external devices associated with the second VLAN that are singly connected to the second MLAG peer.

8. The MLAG domain of claim 5, wherein the first MLAG peer is configured to maintain a first routing table comprising the first routing rule and the second MLAG peer is configured to maintain a second routing table comprising the second routing rule.

9. The MLAG domain of claim 8, wherein the first MLAG peer does not have access to routing rules in the first routing table and wherein the second MLAG peer does not have access to routing rules in the second routing table.

10. The MLAG domain of claim 5, wherein the second MLAG peer is further configured to:
receive, via the peer link, an IP multicast packet associated with a fourth VLAN;
determine that no routing rules apply to the IP multicast packet associated with the fourth VLAN;
bridge a copy of the IP multicast packet associated with a fourth VLAN to at least one external device associated with the fourth VLAN that is singly connected to the second MLAG peer.

11. The MLAG domain of claim 5, wherein the first MLAG peer comprises a first router that implements protocol independent multicasting and the second MLAG peer comprises a second router that implements protocol independent multicasting.

12. A method for processing Internet Protocol (IP) multicast packets in a multichassis link aggregation (MLAG) domain, the method comprising:
receiving, from a first external device, a first IP multicast packet associated with a first Virtual Local Area Network (VLAN) by a first MLAG peer in the MLAG domain;
bridging a copy of the IP multicast packet to all external devices in the MLAG domain, other than the first external device, associated with the first VLAN;
applying, on the first MLAG peer, a first routing rule to the first IP multicast packet to obtain a new IP multicast packet associated with a second VLAN;
bridging a first copy of the new IP multicast packet associated with the second VLAN to all external devices, associated with the second VLAN, that are directly connected to the first MLAG peer;
forwarding, via a peer link, a second copy of the new IP multicast packet associated with the second VLAN to the second MLAG peer, wherein the second MLAG peer applies a second routing rule to the second copy of the new IP multicast packet associated with the second VLAN to obtain a second new IP multicast packet associated with a third VLAN, wherein a copy of the second new IP multicast packet associated with the third VLAN is forwarded across the peer link;
receiving, via the peer link, a copy of the second new IP multicast packet associated with the third VLAN from the second MLAG peer; and
bridging a copy of the second new IP multicast packet associated with the third VLAN to all external devices associated with the third VLAN that are singly connected to the first MLAG peer.

13. The method of claim 12, wherein the first MLAG peer and the second MLAG peer are multilayer switches.

14. The method of claim 12, wherein bridging the copy of the IP multicast packet to all external devices in the MLAG domain comprises forwarding at least one copy of the IP multicast packet to the second MLAG domain via the peer link.

15. The method of claim 12, wherein the first MLAG peer does not include any routing rules to route IP Multicast packets from the first VLAN to the third VLAN, wherein the first MLAG peer does not include any routing rules to route IP Multicast packets from the second VLAN to the third VLAN, wherein the second MLAG peer does not include any routing rules to route IP multicast packets from the first VLAN to the second VLAN, and wherein the second MLAG peer does not include any routing rules to route IP multicast packets from the first VLAN to the third VLAN.

* * * * *